Nov. 2, 1965  R. V. MATHISON  3,214,810

FASTENER DEVICES

Filed May 23, 1963

INVENTOR:
ROBERT V. MATHISON
BY
ATT'YS

United States Patent Office 3,214,810
Patented Nov. 2, 1965

3,214,810
FASTENER DEVICES
Robert V. Mathison, 5 Woodcrest Road, Asheville, N.C.
Filed May 23, 1963, Ser. No. 282,660
2 Claims. (Cl. 24—87)

This invention, in general, relates to fastener devices for fabrics and the like. The fastener devices of the invention are particularly useful wherein the well known safety pin is used commonly, e.g., in the pinning of diapers.

Safety pins have been accepted by the public for years as best device for securing folds of diapers together in the form of a diaper garment on an infant, despite the fact that the sharp point of the safety pin has caused consternation in almost every parent who has changed a diaper. The worry over sticking or scratching an infant or himself with the sharp point has not been pointless because it is ventured that almost every infant, or parent changing a diaper, has been stuck or scratched accidentally thereby at least once. It is also well known that infants occasionally swallow open safety pins, presenting the risk that the safety pin will do damage to the throat, esophogus, stomach or intestine.

The diaper folds are secured together by the fasteners of the invention without worry as to sticking or scratching the infant or the person using them. There is also little, if any, danger to the stomach or intestine if an infant should accidentally swallow the fastener or a part thereof.

Briefly, the fasteners of the invention are made of two basic parts, a spreadable, opposing wall fastener body with sharp projections on the inner, opposing surfaces of the opposing walls and a fastener closure cap member adapted to force the opposing walls of the fastener body to collapse toward one another.

It is an object of this invention to provide improvements in fastening devices adapted to grip and hold folds of fabric.

Another object is to provide improvements in diaper fastening devices.

Still another object is to provide improvements in clamp-type fastening devices employing tapered, pointed projections which penetrate and hold the fabric in the fastening devices of the invention.

Other objects and advantages of the invention will be apparent to those skilled in the art from the following description of a preferred embodiment of the invention which is illustrated in the drawing wherein.

Figure 1:
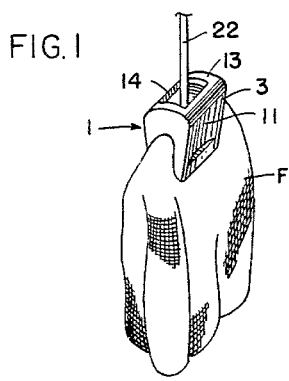
FIG. 1 is a perspective view of the fastening device in gripping relationship with a fabric fold, the connector rod being shown in fragment.

Referring to the drawing, there is shown a fastening device 1 made of a resilient, spreadable and collapsible wall fastener body 2 and a fastener closure cap member 3 into which the fastener body 2 may be drawn to collapse its walls and from which it may be ejected to spread its walls.

The fastener body 2 is a thin wall, U-shaped member made from a flexible, springable material such as metal or synthetic thermoplastic, e.g., nylon, Delrin, Teflon, etc. The opposing legs 4, 5 are joined by a bight portion 6 formed integrally therebetween to form a unitary U-shaped bar having an innate resiliency to spring open to the position shown in FIG. 3 wherein the legs 4, 5 diverge and being collapsible against opposite sides of folds and/or layers of fabric F, e.g., diapers, or other surface penetrable material inserted therebetween, wherein said legs are substantially parallel.

The bottom, outer edges of walls or legs 4, 5 may have therealong flanges or lips 7, 8, the upper surfaces 9 of which abut against the lower edges of the side walls 10, 11 of the cap closure member 3. The lower portions of said side walls 10, 11 may be inwardly curved, as at 12, to provide finger grooves.

Figure 2:
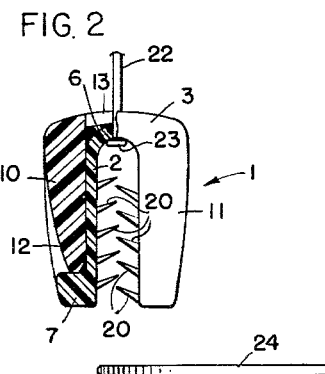
FIG. 2 is a view of the same combination in side elevation and partly in cross-section.
Figure 3:
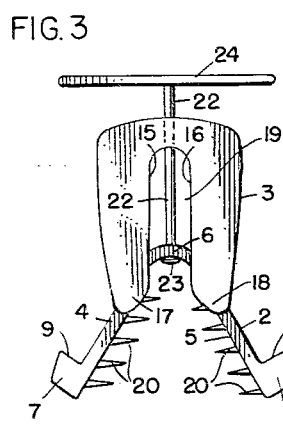
FIGS. 3 to 5 are views in side elevation of the steps employed in inserting and locking fabric folds, i.e., as in a diaper, in the fastener of FIGS. 1 and 2.
Figure 4:
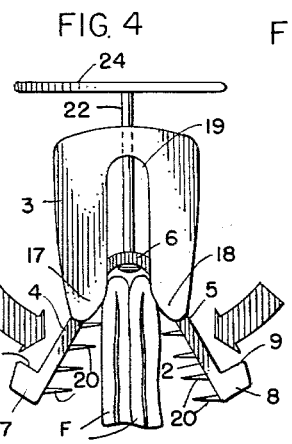

The closure member 3, besides side walls 10, 11, comprises a top or cross wall 13 with an opening 14 therein and end walls 15, 16 at each end thereof forming with the inside of walls 10, 11 slide tracks in which legs 4, 5 are slidable. The lower ends 17, 18 of end walls 15, 16 project beyond the lower edges of walls 10, 11 to keep fastener 2 oriented with regard to closure 3 when the fastener is open (FIGS. 2 and 3).

The inner edges of end walls 15, 16 form a slot 19 at each end of the closure member 3. The fabric held by the fastener member may extend through these slots. Therefore, slots 19 have a width at least substantially equal to the distance between legs 4, 5 when the fastener 2 is in the closed position.

The walls or legs 4 and 5 have, on their opposing, inner surfaces, a plurality of small, closely spaced, pointed projections 20. The projections slope at an acute angle relative to said inner surfaces inwardly and upwardly toward bight portions 6. These projections preferably are so small and closely spaced that they do not pose skin scratch or prick problems if they are accidentally touched, but even this possibility is remote in view of their position on the inner surfaces of legs 4, 5. If the fastener member 2 is molded from synthetic plastic, the projections 20 may be molded integrally therewith. As an alternative, the projections may be molded from synthetic plastic integrally with a plastic base or support member 21 (FIGS. 6–9). The latter may then be adhered to the inner surfaces of walls or legs 4 and 5.

The fastener member 2 and closure member 3 may be entirely separate pieces. The fastener member 2, in such case, may be pinched by finger pressure on lips 7, 8 over an edge of the fabric folds and/or layers F. With the other hand, the cap closure 3 is slipped down over the fastener 2 to lock the fastener in closed position. The projections 20 penetrate the fabric and hold it tightly in the fastener. Their slope is opposite to the direction of pull of the fabric out of the fastener. The more the fabric is pulled, the more the sloping projections penetrate the fabric.

Figure 5:
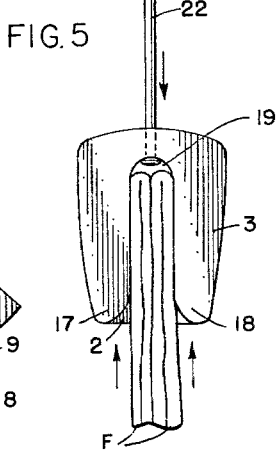
Figure 6:
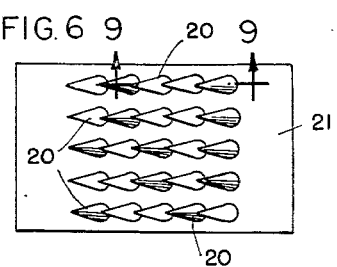
FIGS. 6, 7 and 8 are, respectively, a top plan view, side elevation and front elevation of the sloped projection members of the device.
Figure 9:
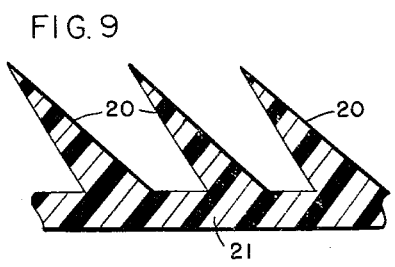
FIG. 9 is an enlarged, side view in section of three of said projections.
Figure 7:
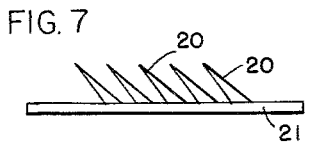
Figure 8:
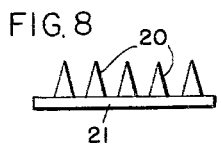

The fastener member 2 and cap member 3 may be held together so as not to be completely separable. To this end, the bight portion 6 may have a rod 22 slidably mounted therein with a small head or knob 23 at one end of the rod. At its other end, the rod 22 has a cross bar 24 having a length wider than the largest dimension (the diagonal) of opening 14 so that the bar cannot pass therethrough. Thus, when fastener member 2 is withdrawn from cap closure member 3, rod 22 keeps it interjoined with the cap closure member. The rod 22 and cross bar 24 can also be used to pull fastener member 2 into the cap closure member. When the fastener is in closed position with the fabric held therein (FIG. 5), the rod 22, slidable in bight portion 6, can be pushed between the fabric layers and folds held in the fastener to allow bar 24 to lie flat against upper wall 13 of the closure member 3.

The projections 20, formed on the supporting structure, e.g., the synthetic polymer walls 4, 5 or on the synthetic polymer support member 21, most advantageously comprise a plurality of smooth sided, substantially rigid, closely spaced projections integrally formed of said polymer on at least one side of said supporting structure and tapering from their bases to relatively sharp tips. The said projections preferably extend outwardly from said supporting structure at an angle of 30 to 80°. These projections are preferably closed spaced in parallel rows in which they all extend in the same direction and the rows are close enough together so that the tips of projections in one row extend above the sides, or partially overlap the projections in an adjacent row. In other words, if a vertical line were drawn from the tip of one projection it would intersect the side of an adjacent projection. The projections are preferably conical or pyramidal and are spaced from one another at their bases a distance of 0.03 to 0.10 inch. They also preferably have a center-to-center spacing at their tips from 0.03 to 0.25 inch. The size of the bases of the projections is preferably at least 0.03 inch in one dimension. The vertical height of the tips of the projections from the supporting structure is preferably within the range of 0.03 to 0.150 inch. The number of projections is preferably within the range of 200 to 500 per square inch.

As a typical example, the projections can be 0.050 inch in length and slanted at an angle of 45° with the supporting structure. The bases of these projections can be 0.030 inch in diameter and taper to a tip having a diameter of 0.010 inch. The supporting structure can be 0.014 inch in thickness at places where there are no projections and the over-all thickness from the tips of the projections through the supporting structure can be 0.064 inch. There can be a projection tip every 0.050 inch or about 400 points per square inch.

As another example, the thickness of the supporting structure can be 1/32 inch. The projections can be slanted at an angle of 55°. The projections are disposed in rows in two directions, the rows being 1/16 inch apart and the projections being 1/16 inch apart center-to-center in each row. The vertical height from the tips of the projections to the top of the supporting structure can be 1/16 inch. Considering each projection as a cone, the base can be 1/32 inch. The projections can overlap each other to the extent that a vertical line drawn from the tip of one projection will substantially intersect the mid-point of the base of the preceding projection. Thus, a fastener of this type containing eight projections in each row longitudinally and seven rows laterally will occupy a space of approximately 1/2 inch on each side allowing some room for margins.

The size and arrangement of the projections will vary to some extent depending upon the intended use but in most cases it is preferable that the projections be integrally formed or molded on a supporting sheet at an angle of 45 to 60°, that the adjacent projections be separated from each other center-to-center by a distance of from 0.060 to 0.150 inch, and that the vertical height from the tips of the projections to the surface of the supporting sheet be from 0.060 to 0.150 inch.

The synthetic polymer from which the fastener is formed can be a homo-polymer, such as a polymer of formaldehyde (e.g., Delrin), or a polymer of tetrafluoroethylene (e.g., Teflon), or polyethylene or polypropylene, or a copolymer (e.g., nylon). These polymers can also be described as synthetic resins.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. A fastener comprising a U-shaped bar having a bight portion and legs springable from a closed position wherein said legs are substantially parallel, to an open position wherein said legs diverge, a closure member including a pair of spaced, rigidly positioned walls slidable over said legs and spaced apart a distance to force said springable legs from said open position to said closed position when said closure member is slid over said U-shaped bar into embracing relationship therewith, the inner, opposing sides of said legs each having a group of closely spaced, integrally formed, small projections emanating from said inner sides, said projections of each of said groups being arranged in transverse, parallel rows, said projections being smooth-sided and tapering from the bases thereof to relatively pointed outer ends, the longitudinal axes of said projections of each of said groups being straight lines extending at substantially right angles to said respective rows and obliquely to said respective sides at an acute angle with respect to said sides, said projections of each of said groups having an occurrence corresponding to 200–500 projections per square inch of said respective side which is covered by said group of projections, and having a height from the respective tips to the base in the range of 0.030 inch to 0.150 inch, the projections of each of said respective groups sloping relative to said side in a direction toward said bight portion when said U-shaped bar is in said closed position, and each of said groups of projections forming a unit of sloping, closely spaced, penetrating members adapted to penetrate closely-spaced surface openings of a fabric material held between said legs when said bar is in the closed position, the shortest side of the respective projections of each of said groups also defining from the respective base to the respective tip thereof a straight line sloping at an acute angle relative to said respective side and in a direction toward said bight portion when said U-shaped bar is in said closed position, whereby a pulling force in a direction away from said bight portion on the fabric material held between said legs and penetrated by said projections causes said material to be firmly and deeply seated on said projections and thereby firmly gripped between said legs, said gripped portion of said fabric material being quickly releasable from said projections upon opening of said U-shaped bar.

2. A fastener comprising a U-shaped bar having a bight portion and legs springable from a closed position wherein said legs are substantially parallel, to an open position wherein said legs diverge, a closure member including a pair of spaced, rigidly positioned walls slidable over said legs and spaced apart a distance to force said springable legs from said open position to said closed position when said closure member is slid over said U-shaped bar into embracing relationship therewith, the inner, opposing sides of said legs each having a group of closely spaced, integrally formed, small projections emanating from said inner sides, said projections of each of said groups being arranged in parallel rows extending both transversely and longitudinally along said respective inner sides, said projections being smooth-sided and tapering from the bases thereof to relatively pointed outer ends, the longitudinal axes of said projections of each of said groups being straight lines extending at substantially right angles to said respective transverse rows and obliquely to said respective sides at an acute angle with respect to said sides, said transverse rows of said projections being spaced sufficiently close on each of said sides so that the tips of said projections in the respective transverse rows overlie the bases of the projections in the same group in the next adjacent row, said projections of said respective groups having a height from the respective tips to the base in the range of 0.030 inch to 0.150 inch, the projections of each of said respective groups sloping relative to said side in a direction toward said bight portion when said U-shaped bar is in said closed position, and each of said groups of projections forming a unit of sloping, closely spaced, penetrating members adapted to penetrate closely-spaced surface openings of a fabric material held between said legs when said bar is in the closed position, the shortest side of the respective projections of each of said groups also defining from the respective base to the respective tip thereof a straight line sloping at an acute angle relative to said respective side and in a direction toward said bight portion when said U-shaped bar is in said closed position, whereby a pulling force in a direction away from said bight portion on the fabric material held between said legs and penetrated by said projections causes said material to be firmly and deeply seated on said projections and thereby firmly gripped between said legs, said gripped portion of said fabric material being quickly releasable from said projections upon opening of said U-shaped bar.

References Cited by the Examiner

FOREIGN PATENTS

| | | | |
|---|---|---|---|
| 717,722 | 1/03 | Strickland | 24—251 |
| 809,551 | 1/06 | Brunner | 24—260 |
| 890,241 | 6/08 | Livingston | 24—260 |
| 2,041,262 | 5/36 | Ness | 24—205.13-5 |
| 2,527,484 | 10/50 | Lester | 24—251 |
| 3,031,730 | 5/62 | Morin | 24—205.13-5 |
| 3,047,921 | 8/62 | Lorker | 24—161 |
| 3,137,027 | 6/64 | Birkle | 16—87.2 |

FOREIGN PATENTS 309,288  1/33  Italy.

DONLEY J. STOCKING, *Primary Examiner.*